A. BARR & W. STROUD.
SIGHTING APPARATUS FOR ORDNANCE.
APPLICATION FILED FEB. 17, 1913.
1,164,325.
Patented Dec. 14, 1915.
4 SHEETS—SHEET 3.
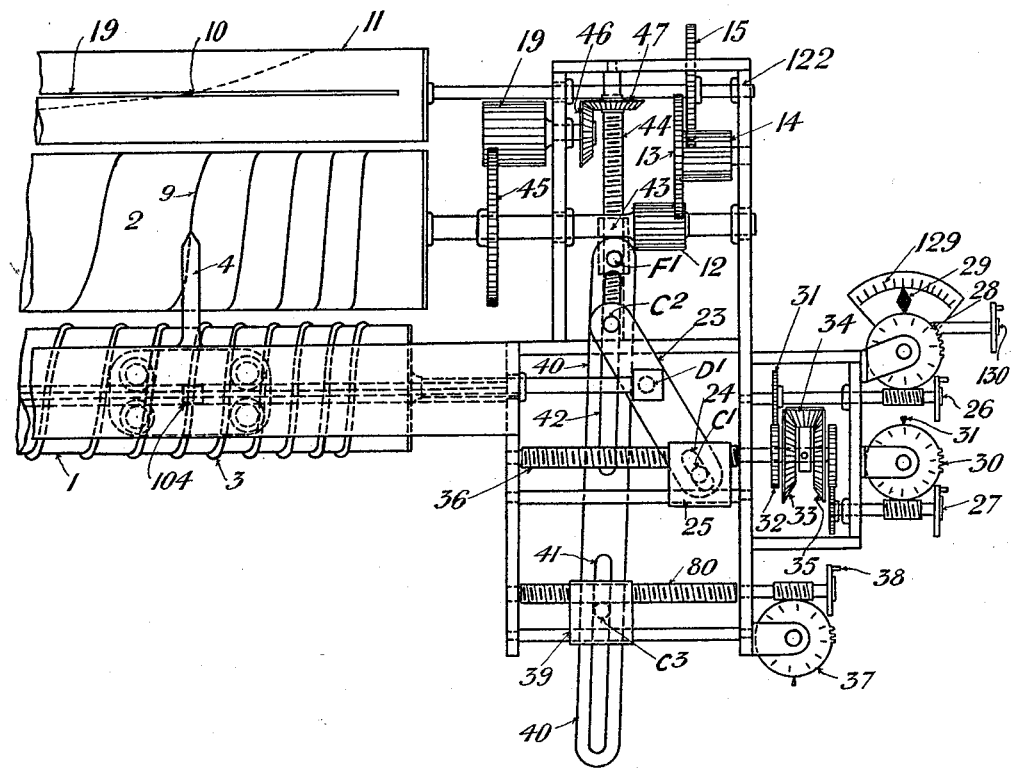
FIG: 5.ª
Witnesses.
Jean M. Montague
Gertrude Manning
Inventors.
Archibald Barr.
William Stroud.
By T. Walter Fowler
atty.

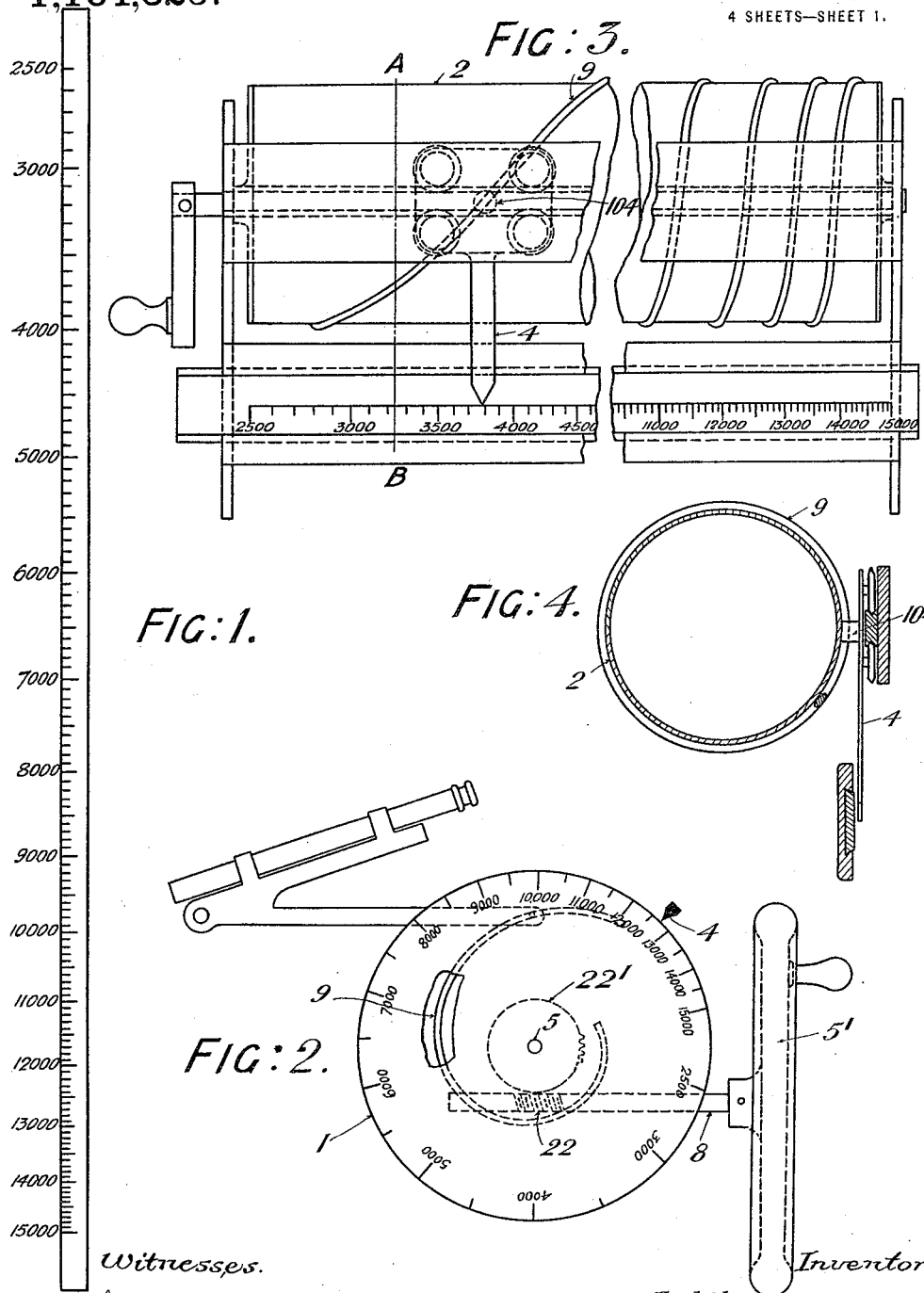

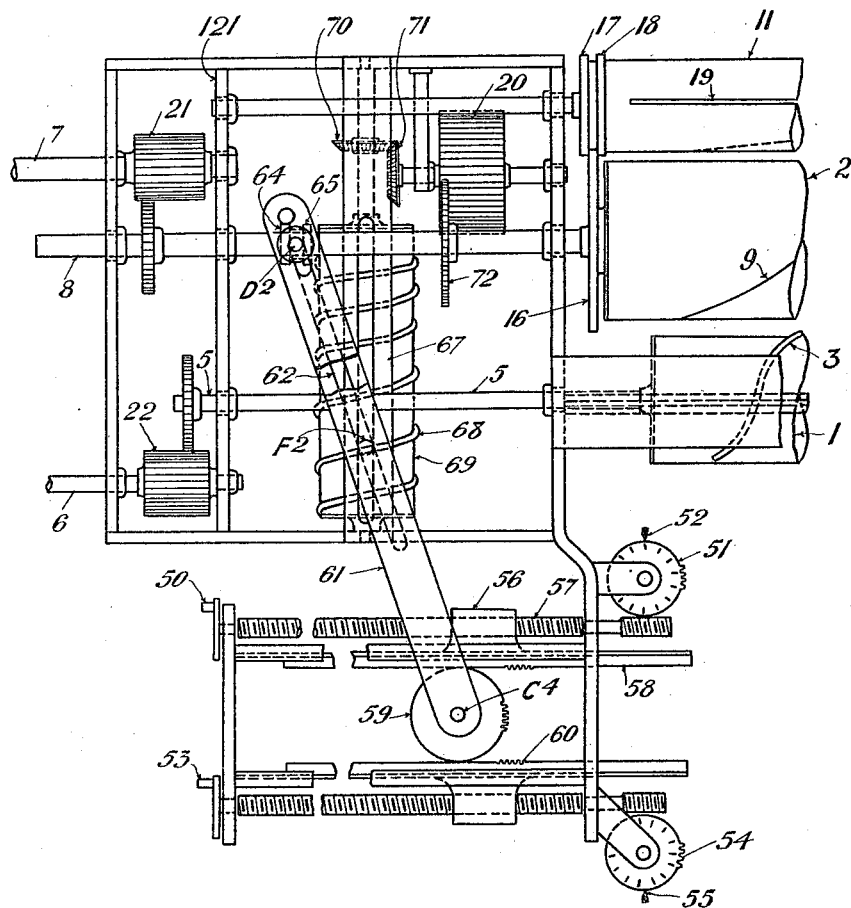

A. BARR & W. STROUD.
SIGHTING APPARATUS FOR ORDNANCE.
APPLICATION FILED FEB. 17, 1913.
1,164,325.
Patented Dec. 14, 1915.
4 SHEETS—SHEET 4.
FIG: 6.
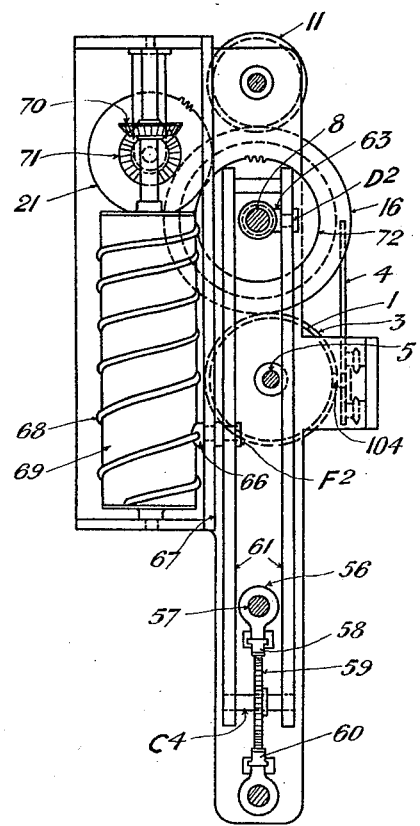
FIG: 7.
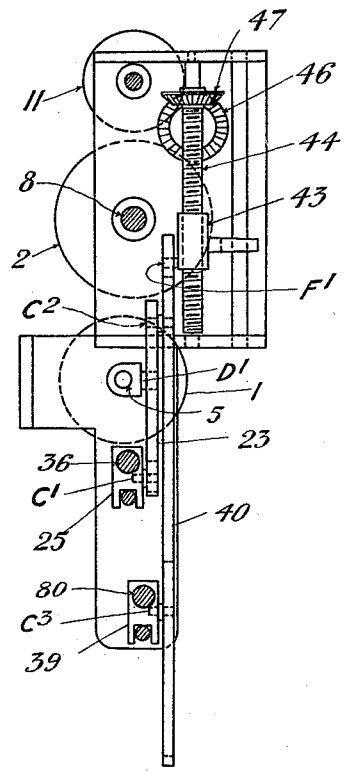
Witnesses.
Jean M. Montague
Gertrude Manning
Inventors.
Archibald Barr.
William Stroud.
By T. Walter Fowler
atty.

UNITED STATES PATENT OFFICE.

ARCHIBALD BARR AND WILLIAM STROUD, OF ANNIESLAND, GLASGOW, SCOTLAND.

SIGHTING APPARATUS FOR ORDNANCE.

1,164,325.    Specification of Letters Patent.    Patented Dec. 14, 1915.

Application filed February 17, 1913. Serial No. 748,866.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Sighting Apparatus for Ordnance, (for which we have made application for patent in Great Britain, No. 5,182, bearing date of March 1, 1912,) of which the following is a specification.

The influences that lead to the necessity of applying corrections in gun-setting may be divided into two groups, namely, internal and external. Internal influences being those which affect the muzzle velocity, such as quantity of charge, temperature of charge, condition of charge, condition of the gun, etc. External influences being those which are external to the gun itself, such as rate of change of range, density and temperature of the atmosphere, velocity and direction of wind, etc.

This invention relates to the provision of improved means for use in setting the sight of a gun and has for its object the production of means comprising a scale part and an index part by the use of which corrections due to internal influences affecting the muzzle velocity of the gun can be introduced by making, for any definite change in the muzzle velocity, such, for example, as that developed under full, half, or quarter charge, one and one only definite adjustment between the scale part and the index part; and, further, to provide for the application of corrections required in virtue of external influences affecting the flight of the shot.

In applying the corrections we deal with those due to internal influences in one manner, and those due to external influences in a different manner.

The means appertaining to corrections for change of muzzle velocity according to our invention may comprise a scale of ranges of a new type, or in some cases it may comprise the equivalent of such a scale though the ranges may not be marked by graduation and numbers. The means, if in a form comprising a scale, are of such a nature that the graduations (or equivalent) corresponding to constant intervals of range (1,000 yards for example) diminish as the range increases in an empirical manner so that if two indexes $a$ and $b$ at a fixed distance apart are moved over the scale, the range read at $a$ for any setting of the indexes will be that for one muzzle velocity, and that read at $b$ will be that for another muzzle velocity with the same setting of the gunsight. Gunsight data show that such a scale can be constructed, and they further show that intermediate muzzle velocities can be allowed for with very great accuracy by taking additional indexes between $a$ and $b$. Thus, if we have a pointer movable with reference to a muzzle velocity scale, then when it is placed at $a$ we get settings of the gunsight corresponding to one muzzle velocity, and when at $b$ to another muzzle velocity, and when placed at varying points between $a$ and $b$ we get settings corresponding to intermediate muzzle velocities. To construct such a scale we take two range tables for the same gun with differing muzzle velocities, and construct a table of elevation and the ranges corresponding to the two different muzzle velocities, *e. g.*, we may have:—

| Elevation. | Range with high M. V. | Range with low M. V. | Difference in range. |
|---|---|---|---|
| 1°  | 2270 | 830  | 1440 |
| 2°  | 4100 | 1635 | 2465 |
| 3°  | 5610 | 2335 | 3275 |
| 4°  | 6860 | 2990 | 3870 |
| 5°  | 7925 | 3590 | 4335 |
| 6°  | 8840 | 4130 | 4710 |
| 7°  | 9655 | 4645 | 5010 |

Now the problem is to construct such a scale that by shifting the index a certain constant amount we shall pass from the one scale to the other, or in other words, to construct such a scale that if we have two indexes at a fixed distance apart, and the one reads 2270 when the second reads 830, then when the first reads 4100, the second will read 1635, and so on. It will be clear from the column of differences that as the range increases the difference in range also increases, so that the value of a specified difference in range, say, 100 yards, will be much smaller at the high ranges than at the low. Moreover, it will be clear that when the range is zero, each index should read zero—in other words a scale of the required type to include all ranges down to zero would be infinitely long. We therefore choose a certain minimum range, say, 1000 yards below which we do not provide a true scale. We give here one example:—

| Range for high M. V. | Position of graduation on scale. | Range for low M. V. | Position of graduation on scale. | Interval between positions on scale. |
|---|---|---|---|---|
| 2270 | 199.1 | 830 | 306.8 | 107.7 |
| 4100 | 128.1 | 1635 | 235.8 | 107.7 |
| 5610 | 87.9 | 2335 | 195.4 | 107.5 |
| 6860 | 58.6 | 2990 | 166.2 | 107.6 |
| 7925 | 36.5 | 3590 | 144.1 | 107.6 |
| 8840 | 19.4 | 4130 | 127.2 | 107.8 |
| 9655 | 5.5 | 4645 | 113.2 | 107.7 |
| 10000 | 0 | | | |

The scale corresponding to these readings may then be graduated as follows for the principal divisions:—

| Yards. | Position on scale. |
|---|---|
| 10,000 | 0 |
| 9,000 | 16.5 |
| 8,000 | 35.0 |
| 7,000 | 55.5 |
| 6,000 | 78.3 |
| 5,000 | 103.6 |
| 4,000 | 130.9 |
| 3,000 | 165.8 |
| 2,000 | 214.4 |
| 1,000 | 287.6 |

To explain how such a scale may be calculated it will be easier to deal with some simple numbers representing ranges in yards. Suppose by a shift of an index mark we desire to pass from:—

```
       10,000 to 7,000 yards
or      9,000 to 6,100
        8,000 to 5,300
        7,000 to 4,600
        6,000 to 4,000
        5,000 to 3,500
```

We may start with a purely arbitrary scale from 10000 yards until we get to 7000 yards, the first range common to the two sets:—*e. g.*

| Range. | Position on scale. |
|---|---|
| 10,000 | 0 |
| 9,000 | 10 |
| 8,000 | 21 |
| 7,000 | 33 |

*i. e.*, we take a purely arbitrary scale from 10000 with gradually increasing differences to 7000 where the overlap commences. Now on this scale the distance between the 10000 and 7000 graduations is 33 parts, consequently we can now fix the positions of 6100, 5300, 4600, since they are 33 parts greater than 9000, 8000 and 7000, respectively. We thus get:—

| Range. | Position on scale. |
|---|---|
| 6100 | 43 |
| 5300 | 54 |
| 4600 | 66 |

But the two partial scales so constructed do not combine well because the interval between the 8000 and 7000 yards graduation on the first is 12 parts, whereas the interval between the 7000 and 6100 yards graduation on the second is 10 parts, thus the interval between the 7000 and 6000 yards graduations would be roughly represented by $$\frac{10}{9} \times 10 \text{ parts}$$

or 11 parts. But since the interval between the 8000 and 7000 graduation should be equal to that between 7000 and 6100, the interval between the 8000 and 7000 yards graduation should be less than the interval between the 7000 and 6000 yards graduations, which is not the case. As a matter of fact the rate of increase in the intervals per 1000 yards between the 10000, 9000, 8000 and 7000 yards graduations has been too rapid.

We next try:—

| | |
|---|---|
| 10000 | 0 |
| 9000 | 10 |
| 8000 | 20.5 |
| 7000 | 31.5 | which gives an interval of 31.5 between 10000 and 7000 and then we get:—

| | |
|---|---|
| 6100 | 41.5 |
| 5300 | 52.0 |
| 4600 | 63.0 |

Now the interval between the 8000 and 7000 yards graduations is 11 parts for 1000 yards, while that between the 7000 and 6100 yards graduations is 10 parts for 900 yards, or roughly 11.1 parts for 1000 yards, which is better than before, but is still capable of improvement. By proceeding in this way we succeed after a few trials in obtaining a scale suitable for the purpose in view.

Instead of a scale of ranges constructed in the manner above described, a diagram could be constructed having a like property. Thus if we set out a scale of ranges of any type, say, a uniform scale along a vertical axis of coördinates and a scale of ranges of the type described above along a horizontal axis, it will be evident that we can construct a curve such that if we move two vertical lines at a fixed distance apart along the diagram, the points in which these lines cut the curve will represent, by reference to the vertical scale of ranges, the two ranges that would be respectively reached with a given setting of the gunsight with two given muzzle velocities for the particular gun for which the curve has been drawn. It will be evident that such a curve can be drawn with any type of vertical scale of ranges. Thus, for example, instead of a uniform scale of ranges we might construct the curve with a reciprocal scale of ranges such as is represented by the motions of the operating gear in a type of short base rangefinder in general use. When such a diagram has been constructed, it could be wrapped on the surface of a drum so as to constitute a spiral line thereon. If then, rotations of the drum are made in accordance with the chosen scale of ranges (for example, rotations by equal amounts for each 25 yards of range) a pointer moved parallel to the axis of the drum so as to keep in contact with the spiral line will move longitudinally in accordance with the corresponding intervals on a scale of the new type described. The scales may then be omitted and the rotational motion of the drum and the translational motion of the pointer will have the desired relationship. Further, if a spiral groove or ridge be formed on the drum instead of the line, a piece, guided to move parallel to the axis of the drum, can be controlled in its longitudinal motion by the groove or ridge. In this way we shall have the desired relationship between the rotation of the drum and the translational motion of the guided piece.

Some examples of constructions according to this invention will now be described with reference to the accompanying drawings, in which:—

Figure 1 represents a scale determined according to this invention. Fig. 2 represents diagrammatically an application of the new type of scale to a gun sight. Fig. 3 is an elevation and Fig. 4 a transverse section taken about the line A B of Fig. 3, illustrating another form of gear, embodying the same principle. Figs. 5 and 5A are together an elevation of a modified form of mechanism embodying the new features. The mechanism is shown broken in the middle so as to reduce the size of the figure. Figs. 6 and 7 represent end views of parts of the mechanism illustrated at Fig. 5 after removal of the plates 121 and 122 respectively.

The scale shown in Fig. 1 is determined from the ballistic characteristics of the particular gun to which the sight is adapted, after the manner already described.

Fig. 2 illustrates how the new type of scale can be applied to a gunsight, but for simplicity we have omitted in this figure any arrangement of dials or mechanisms for the application of the correction. A disk 1, is carried on an axle 5, and operated by a hand wheel $5^1$, a shaft 8, a worm 22 and worm wheel $22^1$. The disk 1 has a scale determined according to this invention marked around its edge, to be read at a pointer 4. The axle 5 also carries a disk on which a spiral groove 9 is cut, which through the medium of a pin and lever imparts the requisite inclination to the gunsight. The groove 9 would be so cut as to give the gunsight the angles corresponding to the ranges set opposite the pointer 4, for a given muzzle velocity. From what has been stated above it will be evident that an alteration in the position of the pointer 4 will make the necessary alteration in the angles at which the gunsight will be set for various ranges, to suit another muzzle velocity. A scale of muzzle velocities could therefore be used in connection with the pointer so that the pointer could be set for any given muzzle velocity. Instead of moving the pointer 4, it will be recognized that the scale disk 1 could be mounted capable of angular adjustment about the axle 5.

Figs. 3 and 4 show another arrangement having a like effect. A drum 2 has formed on its surface a spiral groove or ridge 9 which, by a slider 104, controls the position of a pointer 4 working over a scale of ranges of the new type. When the drum 2 is rotated the pointer 4 will move over the scale, and if the drum is so connected to the gunsight that the angular elevations of the gunsight for any settings of the pointer are those required for the ranges read on the scale for one muzzle velocity, the apparatus can be made to suit for another muzzle velocity by a longitudinal shift of the scale (or a longitudinal shift of the drum 2).

The corrections for influences that affect muzzle velocity can thus be made by moving the scale longitudinally (or by moving the drum axially).

In Fig. 5 two drums are shown, a range drum 1 and an elevation drum 2. Upon 1 is constructed a cam groove or raised cam spiral 3, into or onto which there is forked a piece 104 which moves the pointer 4 forward or backward as the drum 1 is rotated by means of its shaft 5 in accordance with the range communicated (say, by means of step-by-step mechanism) to the shaft 6. The spiral cam is constructed in the manner above described. A shaft 7 communicates with or is geared to the elevating mechanism of the gunsight. As 7 is rotated the motion is communicated to a shaft 8 which is rigidly connected to the elevation drum 2 upon which is constructed a spiral line 9 of appropriate form. The form of this spiral will depend upon the type of mechanism used to move the gunsight relatively to the gun barrel and the arrangement of the connection adopted between the shaft 8 and that mechanism.

In general the line may be supposed to be constructed by choosing a muzzle velocity, setting the range drum 1 successively to a number of ranges and the angle of elevation of the gunsight simultaneously to the angles corresponding to these ranges, (and marking the point to which the pointer 4 comes); a line joining such points will form the spiral required.

The range drum 1 and the elevation drum 2 are in conformity when the line 9 has been brought by rotation of the shaft 7 until it coincides with the pointer 4. It will be clear, however, that if the elevation drum 2 were rotated through exactly one revolution, there would still be apparent conformity between the two drums. This difficulty would not arise if the spiral line on the elevation drum 2 made less than one turn on the drum. A more suitable form of spiral is obtained by making it take more than one turn round the drum, and in this case in order to discriminate between the different turns a variety of methods may be adopted; the one shown in the figure consists in providing a single turn 10 upon a secondary drum 11 which is geared up to the elevation drum 2 by toothed wheels, 12, 13, 14, 15, so that 11 makes one revolution or less for the whole elevation of the gunsight. The drum 11 is axially translated with the elevation drum 2 by means of a disk 16 (fixed to the elevation drum 2) which is forked between two disks 17 and 18 attached to the secondary drum 11. In front of the secondary drum 11 is a long horizontal slit 19 in an opaque diaphragm (not shown), so that only a small part of the line 10 is visible at any one setting of the drum 11. To bring the elevation drum 2 into rough conformity with the range drum 1, we rotate the shaft 7 until the visible part 10 of the line is above the pointer 4, and we can then bring the two drums into exact conformity by a further rotation of the shaft 7 until the line 9 lies exactly under the pointer 4.

Corrections which affect muzzle velocity may be introduced by a suitable translation of either drum along its axis, or some of the corrections can be introduced by translating the one drum and some by translating the second drum. If several corrections are to be applied to one drum, these separate corrections may be added together by means of differential gearing, or the equivalent.

To introduce any correction of the second group (which depend upon external influences) we may displace one or other of the drums axially by an amount which depends upon the magnitude of the correction multiplied by a function of the elevation. In the general case this may be accomplished by means of a lever whose fulcrum is shifted by a suitably cut cam moved by the elevating gear of the gunsight.

To introduce the requisite corrections we provide means for translating the drums 1 and 2 axially. In Figs. 5 and 5ª corrections for the following are imparted to the range drum 1:—Temperature of charge, condition of charge, number of shots fired, and effect of rate of change of range. The corrections imparted to the elevation drum 2 are those corresponding to the temperature and pressure of the atmosphere. It will be clear, however, that the distribution of these corrections between the two drums might have been very different, and if desirable all the corrections might have been made by suitable translations of one of the drums. Since the drums have to be translated axially for these corrections, and since it is necessary to still maintain the gearing between certain portions of the mechanisms, we may make certain of the gear wheels, e. g., 12 14, 19, 20, 21, 22, long in the direction of their axes.

The longitudinal position of the range drum 1 is determined by a pin $D^1$ and that of the elevation drum 2 by a pin $D^2$.

$D^1$ is fixed to a lever 23 so that the position of $D^1$ depends upon the position of this lever which again is determined by the position of a pin $C^2$ fixed to 23 and a slot 24 in which works the pin $C^1$ attached to a nut 25. A handle 130 is for the purpose of setting off the correction for, say, the condition of the charge and a handle 26 for accomplishing the same purpose for, say, the temperature of the charge. Upon turning the handle 130 a double pointer 29 is rotated about the center of a toothed wheel 28 by a worm and worm-wheel (not shown) until the condition of the charge is correctly indicated by the upper part of the pointer 29 upon a scale 129. The lower point of the pointer 29 is then used as the pointer for the scale upon 28 so that the temperature of the charge may now be set off by rotating the handle 26. In the same way a handle 27 is for setting the number of shots fired as marked upon a dial 30 opposite a fixed pointer 31. The rotation of the handle 26 communicates its motion by means of toothed gearing 31, 32 to a bevel 33 of differential gear 33, 34, 35. In the same way the handle 27 can be used to rotate the bevel 35. The floating bevel 34 attached to a shaft 36 thus takes up a position dependent upon the readings of the dials 28 and 30.

The rate of change of range is set off upon a dial 37 by rotating a handle 38, which causes a nut 39 and pin $C^3$ to be moved horizontally along a screw 80. In this case the motion of $C^3$ has not to be communicated directly to the drum 1, because if this were done, the shift of the drum would be independent of the range, whereas the shift of the drum ought to correspond to a change of range of $$T\frac{dR}{dt}$$

where T is the time of flight of the shot and $$\frac{dR}{dt}$$

the rate of change of range. Now the muzzle velocity scale shown in Fig. 1 is not such that the portion of the scale corresponding to a change of range represented by $$T\frac{dR}{dt}$$

is of the same magnitude at different parts of the scale. As a matter of fact for the same value of $$\frac{dR}{dt}$$

we require to produce a bigger motion of the range drum 1 at the high ranges than at the low, and this may be accomplished by shifting the fulcrum $F^1$ of the bar 40 in which are the two slots 41 and 42 embracing the two pins $C^3$ and $C^2$ respectively. The fulcrum $F^1$ is attached to a nut 43 which is moved upward by a screw 44 as the range increases. The motion of this nut 43 in accordance with the range is accomplished by gear 45, 19 and bevels 46, 47, in the following way:—As the shaft 7 is rotated to bring the two drums into conformity the elevation drum 2 (to the shaft of which 45 is fixed) is rotated, and therefore by means of 45, 19, 46, 47 and 44, the fulcrum $F^1$ is raised or lowered to the correct position. It will thus be seen that the position of the range drum 1 is only correctly set for the correction for rate of change of range after the two drums have been brought into conformity.

In a similar manner we may set off the corrections for the temperature and barometric pressure of the atmosphere by moving the elevation drum 2 axially. The temperature, say, is set off by a handle 50 and indicated by a dial 51 and fixed pointer 52. The pressure is set off by a handle 53 and indicated by a dial 54 and pointer 55. The rotation of the handle 50 translates a nut 56 by means of a screw 57. Attached to the nut 56 is a rack 58 gearing into a pinion 59. In the same way a rotation of the handle 53 moves a rack 60 which also gears into 59. The parts 58, 59 and 60, constitute the equivalent of a differential gear. Thus a pin $C^4$ takes up a position dependent upon the values of the external temperature and pressure. In this case just as in the case of the correction for the rate of change of range, the motion of the drum which it will be necessary to produce will have to be greater the greater the range. We therefore provide a lever 61 pivoted about $C^4$ and having a long slot 62 in which work two pins $F^2$ and $D^2$. The latter pin $D^2$ is attached to a piece 63 between two collars 64 and 65 fixed to the shaft 8, suitable provision being made to prevent rotation of the part 63. The former pin $F^2$ is carried upon a piece 66 which is suitably guided in a vertical slot of a part 67. This fulcrum $F^2$ is carried up and down as the elevation drum 2 is rotated inasmuch as the piece 66 is forked into or onto a recessed or raised spiral cam 68 formed upon a drum 69 which is rotated by bevels 70, 71 and toothed gear 20 and 72.

We claim:—

1. Apparatus for use in setting a gunsight consisting of a range scale element, a gunsight elevation element, and an index element, the index element and the range scale element being longitudinally movable relatively to one another, one being free to so move, the other not, such longitudinal movement being in accordance with a scale of which intervals of longitudinal motion corresponding to, say, 1000 yards, gradually diminish as the range increases in an empirical manner, means for operating the gunsight elevation element in conformity with the longitudinal relative positions of the index and range scale elements, the index element and the range scale element being longitudinally adjustable relatively to one another for the purposes set forth.

2. Apparatus for setting a gunsight consisting of a range drum and an elevation drum, the range drum having a spiral guide about its surface, a piece engaging with the spiral guide mounted to move in a path parallel to the axis of the range drum, means for rotating the range drum in accordance with a chosen scale of ranges, the spiral guide being so generated that the rotations of the range drum produce a progressive motion of the piece along its path in accordance with ranges of which intervals, corresponding to, say, 1000 yards, gradually diminish as the range increases, in such a way that the angular elevation of the gunsight for any range, within the capacity of the apparatus, may be modified to the required extent by making longitudinal adjustments of the drums for introducing the corrections required, the elevation drum having a spiral line upon its surface and the piece a pointer to be brought into conformity therewith, means for discriminating the correct turn of the spiral line on the elevation drum, mechanism for transmitting motion from the elevation drum to the sight, and means for effecting longitudinal adjustments of the drums for introducing the corrections required in virtue of internal and external influences.

ARCHIBALD BARR.
WILLIAM STROUD.

Witnesses:
A. DAVIES,
C. WILSON.

Copies of this patent may be obtained for five cents each, by addressing the "Commissioner of Patents, Washington, D. C."